No. 859,732. PATENTED JULY 9, 1907.
J. H. BIRCH & J. S. FOLEY.
RIBBON FEED MECHANISM FOR TYPE WRITING MACHINES.
APPLICATION FILED MAR. 5, 1907.
3 SHEETS—SHEET 1.
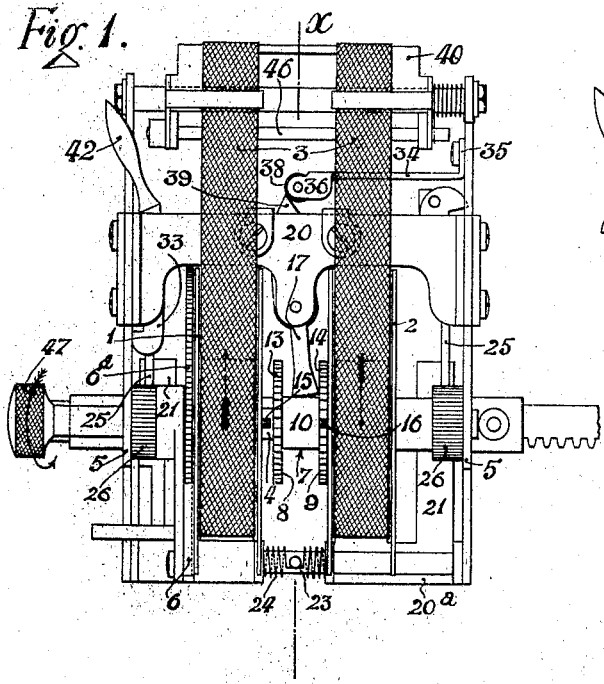
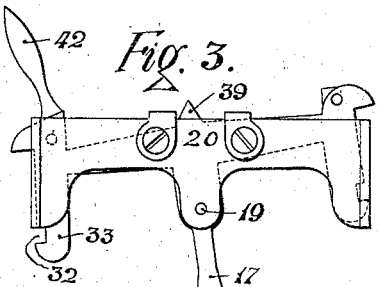
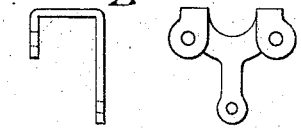
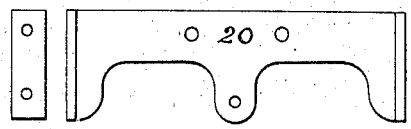
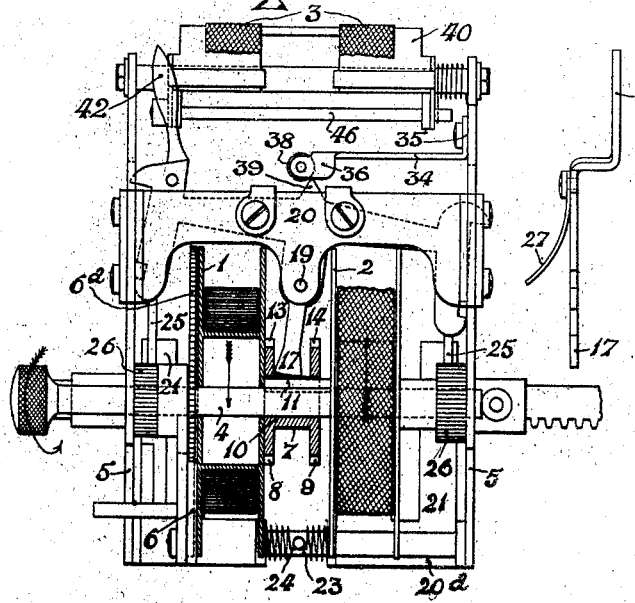
WITNESSES
Inventors
John H. Birch
James S. Foley
By
James L. Norris.
Atty No. 859,732. PATENTED JULY 9, 1907.
J. H. BIRCH & J. S. FOLEY.
RIBBON FEED MECHANISM FOR TYPE WRITING MACHINES.
APPLICATION FILED MAR. 5, 1907.
3 SHEETS—SHEET 2.
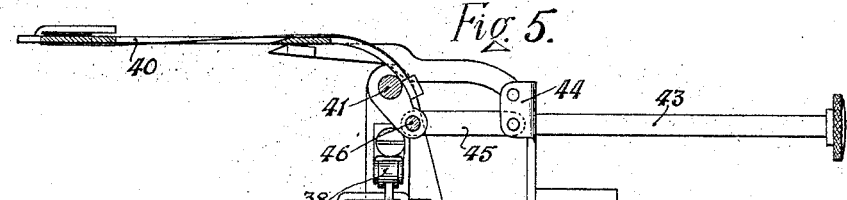
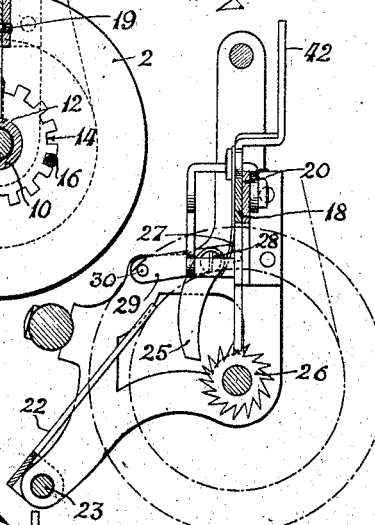
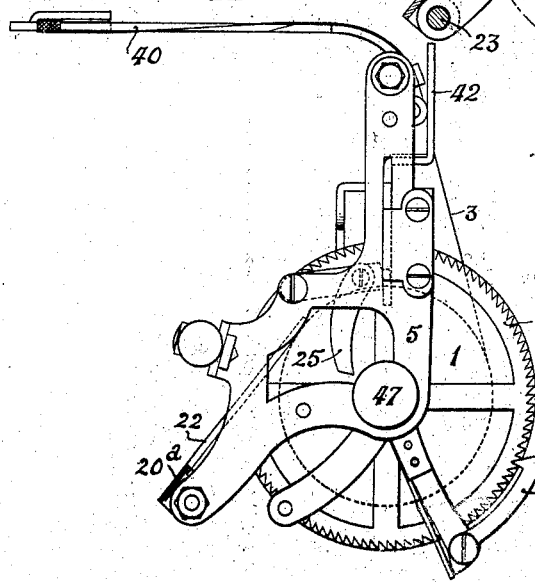
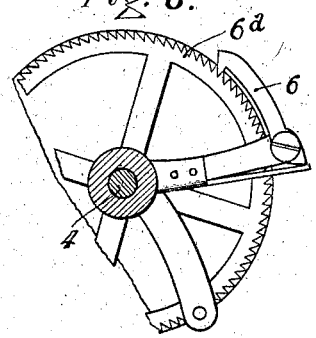
WITNESSES
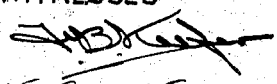
Inventors
John H. Birch
James S. Foley
By
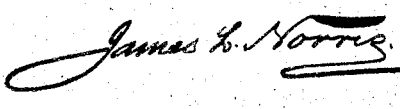

No. 859,732. PATENTED JULY 9, 1907.
J. H. BIRCH & J. S. FOLEY.
RIBBON FEED MECHANISM FOR TYPE WRITING MACHINES.
APPLICATION FILED MAR. 5, 1907.
3 SHEETS—SHEET 3.
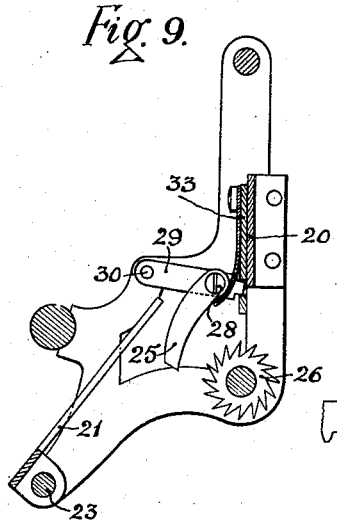
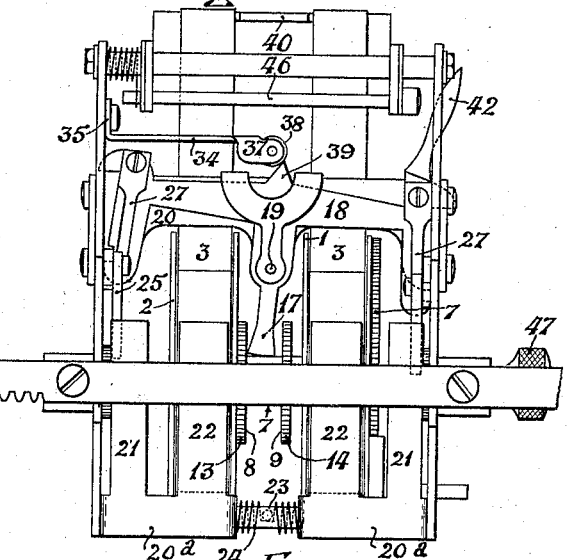
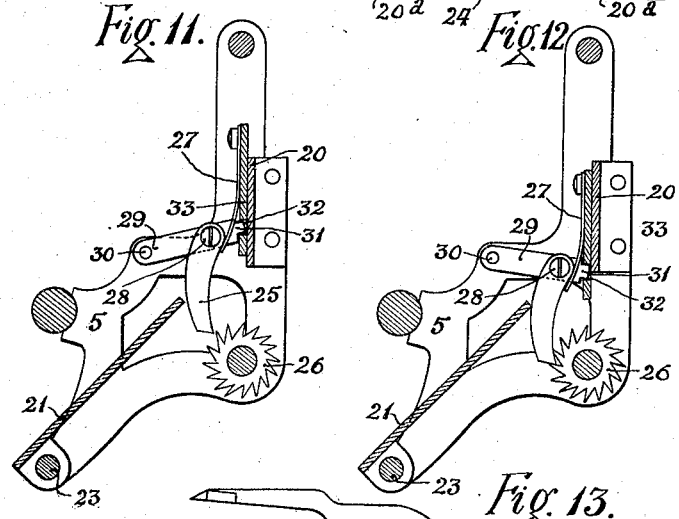
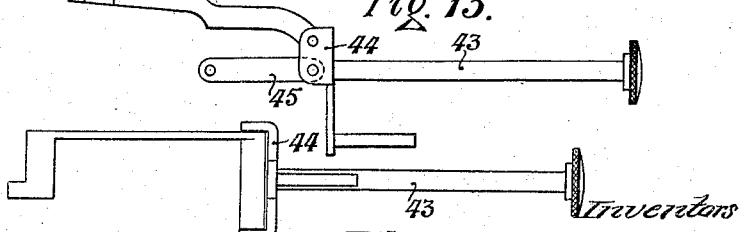
WITNESSES
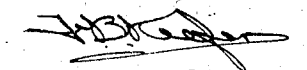
Inventors
John H. Birch
James S. Foley
By
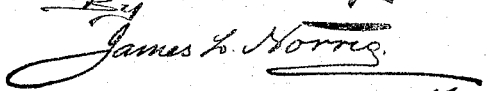

UNITED STATES PATENT OFFICE.

JOHN HENRY BIRCH AND JAMES SAMUEL FOLEY, OF WEST BROMWICH, NEAR BIRMINGHAM, ENGLAND.

RIBBON-FEED MECHANISM FOR TYPE-WRITING MACHINES.

No. 859,732.     Specification of Letters Patent.     Patented July 9, 1907.

Application filed March 5, 1907. Serial No. 360,722.

*To all whom it may concern:*

Be it known that JOHN HENRY BIRCH and JAMES SAMUEL FOLEY, subjects of the King of Great Britain, residing at High street, West Bromwich, near Birmingham, England, have invented certain new and useful Improvements in Ribbon-Feed Mechanism for Type-Writing Machines, of which the following is a specification.

This invention has relation to ribbon feed mechanism or type inking devices for type-writing machines of that type in which the ribbon is wound on a pair of reels, spools or drums, which when the machine is in use, are actuated so that the ribbon is let off one reel and taken up by the other, and when one reel is emptied the mechanism is automatically reversed and the reel which was previously letting off ribbon is driven in the opposite direction and made to act as the take-up reel for winding on the ribbon, while the other reel which was taking up the ribbon commences to pay out the same, so that the feed is never arrested when the machine is in use.

The principal object of the present invention is to provide an improved and simplified form of mechanism for effecting the aforesaid automatic reversal of the feed motion.

Figure 1 of the accompanying drawings represents a front elevation of the improved ribbon feed mechanism constructed in accordance with this invention. This view shows the parts in the positions they assume when the right hand reel is winding on ribbon, and the left hand reel letting off ribbon. Fig. 2 is a similar view but with the parts in the positions when the left hand reel (shown in section) is winding-on ribbon and the right hand reel letting off ribbon. Fig. 3 is a separate view of part of the rocker mechanism by which the feed is reversed in direction. Fig. 4 shows the component parts of the same separated or disassembled from one another. Fig. 5 is a transverse section on dotted line $x$ Fig. 1. Fig. 6 represents another section showing more clearly the means by which the reversing of the reels is automatically reversed. Fig. 7 is a side elevation of the mechanism. Fig. 8 shows in elevation the ratchet mechanism by which the ribbon-feed mechanism is actuated. Fig. 9 is another vertical section showing the automatically reversing device. Fig. 10 is a rear view of the mechanism. Fig. 11 is a section showing the parts of the automatic reversing means in their normal position. Fig. 12 is a similar view when one reel has been emptied, the direction of rotation being about to be reversed. Fig. 13 shows in side elevation and plan the lifter by which the shield, over which the ribbon passes, is lifted.

The same letters of reference indicate corresponding parts in each of the several figures.

Two reels or spools 1 and 2 (to which the ends of the ribbon 3 are respectively made fast by means of clips or other suitable means) are loosely mounted on a common spindle 4 adapted to be rotated within bearings in the opposite sides of a frame 5 which is attached to the back or other convenient part of the type-writing machine. This spindle 4 receives its motion from a pawl 6 actuated by any suitable moving part of the machine, and engaging with a ratchet wheel $6^a$ secured to the spindle, while rotatory motion is transmitted from the latter to one or other of the reels 1 and 2 by means of a change-over clutch device 7 mounted on the spindle, and arranged to drive either one or other of the reels, this changing-over being effected automatically by the emptying of the reels, as hereinafter described. The said change-over clutch 7 consists of two disks or circular plates 8, 9, mounted at the opposite ends of a short sleeve 10 or the like surrounding the reel-spindle and located between the two reels and rotating with the said spindle but capable of a sliding motion thereon by means of a feather 11 on the latter engaging with a longitudinal key-way or channel 12 in the said clutch.

The peripheries of the disks are recessed or gapped at 13, 14 respectively, while the inner or opposed side of the reels are provided with projecting studs or pins 15, 16, either of which is adapted when the clutch device is moved along the spindle to engage with one of the gaps in the periphery of that disk which is moved towards the reel, as in Fig. 1, when the drive is transmitted from the disk 9 to the reel 2, which will wind on the ribbon, while the other reel 1, which is letting off the ribbon, will be rotated in the opposite direction by the pull of the ribbon. Whereas, if as shown in Fig. 2 the clutch is moved along the spindle towards the letting-off reel 1, the winding-on reel will be disconnected and the stud or pin 15 on reel 1 will engage with the toothed disk 8 and the said reel 1 will now be driven in the opposite direction to before, and will wind on the ribbon, while the other reel 2 will pay-off the same, and will be rotated by the pull of the ribbon, in the opposite direction to that previously.

The change-over movement of the clutch 7 is effected by a hanging member 17 carried by a rocking beam or cross-plate 18, centrally pivoted at 19 to a cross-bar 20 of the frame 5, and with the lower end of the hanger situated between the two disks 8 and 9, so that when the said beam 18 is rocked upon its pivot, the said hanging member 17 is moved to one side or the other and so the clutch taken into engagement with one of the reels.

The rocking of the cross-beam is automatically effected by the emptying of either of the reels, and for this purpose a pair of plates $20^a$ each having a pair of parallel projecting tongue-pieces 21 and 22 respectively, are pivoted at the opposite ends of a spindle 23 at the back of the frame, and the tongues 22 are adapted to lie on the surface of the ribbon on the respective reels, while the other tongues 21 are located on the outer sides of the reels. As the ribbon of one of the reels is gradually paid out, the diameter of the same becomes less, and the tongue-piece 22 lying on its surface follows up the same by the pressure of a spring 24 surrounding the spindle 23, acting on it, and tending to force it towards the axis of the reel. As the outer tongue arm 21 descends, it is adapted when the reel has become empty to act on the back of a pawl 25 and force the nose of the same into engagement with the teeth of a ratchet-toothed wheel 26, mounted on the reel spindle. The said pawl is normally kept out of engagement with the ratchet teeth by means of a light spring 27 acting on the underside of the same and is pivoted at its upper end at 28 to a short horizontal arm 29 pivoted in turn to the frame 5 at 30 and with its outer end 31 engaging in a notch or recess 32 in the side of a downward extension 33 of the rocking beam or cross-piece 18. When the nose of the pawl is thus taken into engagement with the ratchet teeth 26 by the emptying of the reel, as the reel spindle 4 continues to rotate, the said teeth will lift the pawl, causing the arm 29 to which it is pivoted, to move upwards, and will thus raise the end of the rocking arm 18, and a spring 34, acts on the same to take it fully over and disengage the pawl from the teeth, and change the direction of rotation of the reels as afore described. The said spring 34 consists of a horizontally disposed flat strip fixed at 35 to the frame 5, and with the outer end formed with two downwardly depending ears 36, 37 between which a roller 38 is pivoted, and adapted when the rocking arm 18 is in a horizontal position, to lie on the apex of a triangular projection 39 on the top side of the latter, but when the arm is moved into a position slightly out of the horizontal plane, the roller bears on one or other of the sides of the projections and so will take the arm completely over. After the direction of rotation of the reels have thus been reversed, the ribbon will pass off the full reel over a guide or shield 40 pivoted to the frame at 41 and so that the arranged types when operated may strike the ribbon, which latter then passes back to the filling reel. When this latter is filled the motion of the reels will be reversed as above described. Provision is also made for effecting this reversal by hand, and for this purpose the rocking arm or beam 18 is provided at one end with a short lever 42 adapted to be operated by hand, by which means the mechanism may be reversed at any time other than when a reel has become empty.

The lifting of the afore mentioned shield or guide 40, by which the ribbon is led under the types is adapted to be effected by a horizontal rod 43, between ears or the like 44 at the inner end of which one end of a link or bar 45 is pivoted, the other end of which takes over or is pivoted upon the spindle 46 carried by the shield so that when the said rod 43 is forced inwards, the said shield is raised, it being understood that the rod 43 works through the frame of the machine.

The reel spindle 4 is provided with a lateral extension provided with a milled head 47 by which the mechanism may be actuated by hand, so that the ribbon may be adjusted to any position.

Having fully described our invention, what we desire to claim and secure by Letters Patent is:—

1. A reversible ribbon feed mechanism for type-writing machines, comprising two reels loosely mounted upon a spindle and to which the ends of the ribbon are respectively secured, means for rotating said spindle, a clutch device slidable on, but rotatable with, said spindle, and located between said reels, a rocking beam fulcrumed to a fixed frame, and a member carried by said beam adapted, when the latter is rocked upon its fulcrum, to move the clutch along the spindle to connect either one or other of the reels to the said spindle.

2. A reversible ribbon feed mechanism for type-writing machines, comprising two reels loosely mounted upon a spindle, and to which the ends of the ribbon are respectively secured, means for rotating said spindle, a sleeve slidable on, but rotatable with, said spindle and located between said reels, flanges at the ends of said sleeve, gaps or notches in the peripheries of said flanges, projections carried by the inner or opposed faces of said reels, and means for moving said sleeve along the spindle to cause the projections of either one or other of said reels to engage with the gaps or notches of one of the flanges.

3. A reversible ribbon feed mechanism for type-writing machines, comprising two reels loosely mounted upon a spindle, and to which the ends of the ribbon are respectively secured, means for rotating said spindle, a sleeve slidable on, but rotatable with, said spindle, and located between said reels, flanges at the ends of said sleeve, gaps or notches in the peripheries of said flanges, projections carried by the inner or opposed faces of said reels, a rocking beam fulcrumed to a fixed frame, a member carried by said beam and engaging between the flanges of said sliding clutch sleeve, for moving the latter along the spindle, when the said beam is rocked, to cause the projections of either one or other of said reels to engage with the gaps of one of the said flanges.

4. An automatically reversible ribbon feed mechanism for type-writing machines, comprising two reels loosely mounted upon a spindle and to which the ends of the ribbon are respectively secured, means for rotating said spindle, a clutch device slidable on, but rotatable with, said spindle and located between said reels, follower members bearing upon the ribbon on said reels, teeth or projections carried by the reel spindle, swinging members adapted to co-operate with said teeth, means for normally keeping said swinging members out of engagement with said teeth, members carried by said follower members, adapted, when the ribbon is wound off one reel to act upon one of said swinging members and take same into engagement with said teeth, a rocking beam fulcrumed to a fixed frame, a member carried by said beam adapted, when the latter is rocked, to move the clutch along the spindle to connect one or other reel to the spindle, and means for raising one end of said beam when one of the swinging members is engaged with the teeth.

5. An automatically reversible ribbon feed mechanism for type-writing machines, comprising two reels loosely mounted upon a spindle and to which the ends of the ribbon are respectively secured, means for rotating said spindle, a clutch device slidable on, but rotatable with, said spindle and located between said reels, follower-elements bearing upon the ribbon on said reels, members carried by said follower-elements, pawls carried by jointed or pivoted members, and adapted to be acted upon by said members carried by the followers, when one reel is empty, ratchet teeth carried by the reel spindle, adapted to be engaged by said pawls when the latter are acted upon, means for normally keeping said pawls out of engagement with said ratchets, a rocking beam fulcrumed to a fixed frame, a member carried by said beam adapted to move the clutch along the spindle to engage with one or other of the reels, and the ends of said rocking beam engaged by the said pivoted pawl-carrying members.

In testimony whereof we have hereunto set our hands in presence of two subscribing witnesses.

JOHN HENRY BIRCH,
JAMES SAMUEL FOLEY.

Witnesses:
HENRY SKERRETT,
HENRY NORTON SKERRETT.